June 28, 1955      R. H. WITT      2,711,931
CROP CONVEYING SYSTEM
Filed Nov. 21, 1952      3 Sheets-Sheet 1
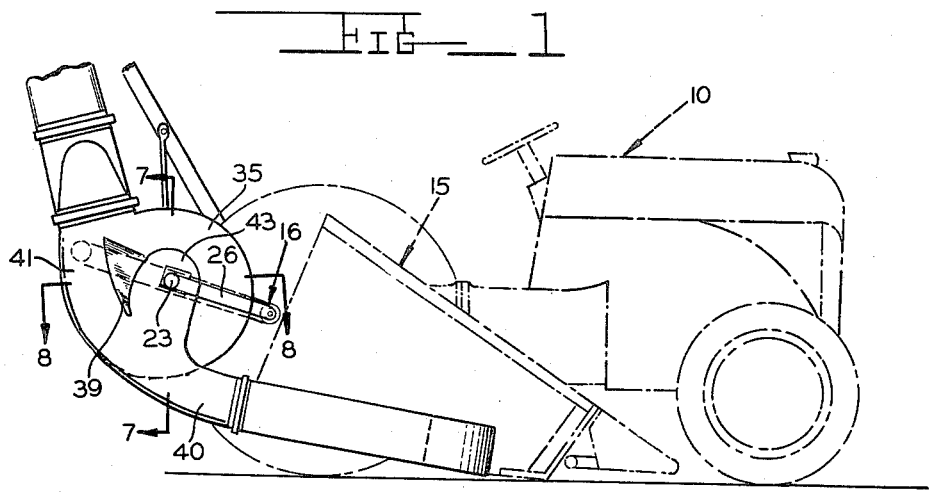
INVENTOR
ROBERT H. WITT
BY
AND
ATTORNEYS

INVENTOR
ROBERT H. WITT

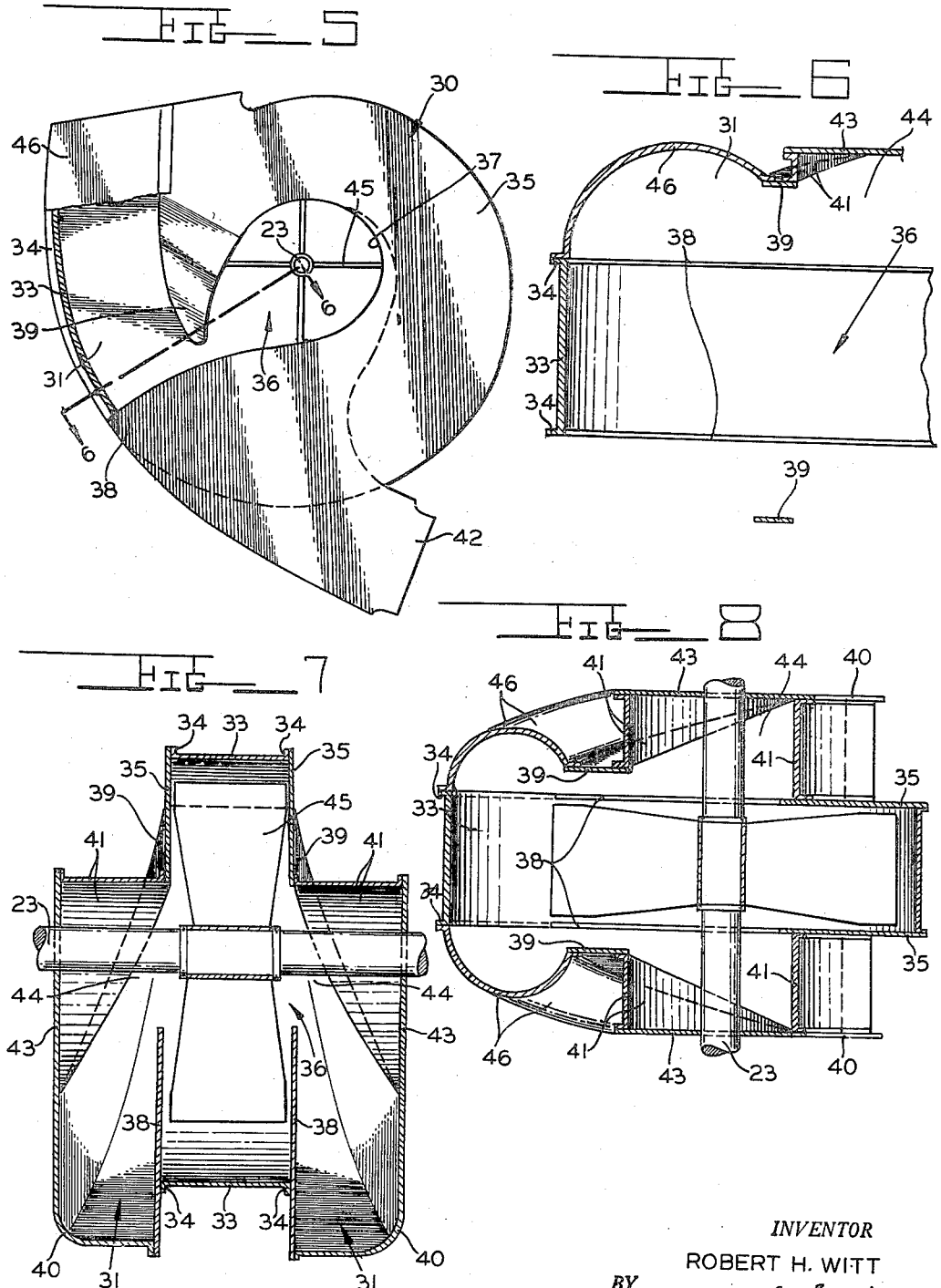

United States Patent Office 2,711,931
Patented June 28, 1955

2,711,931

CROP CONVEYING SYSTEM

Robert H. Witt, Royal Oak, Mich., assignor, by mesne assignments, to Ford Motor Company, Dearborn, Mich., a corporation of Delaware Application November 21, 1952, Serial No. 321,761

6 Claims. (Cl. 302—23)

The present invention refers to a pneumatic conveying system for a harvester and more particularly to a combined suction pickup and pressure discharge centrifugal-type impeller for a cotton harvester.

In the mechanical harvesting of cotton and the like according to present practices of the so-called "stripping" methods, the harvested bolls, after being separated from the plants, are pneumatically conveyed through a combined suction pickup and pressure discharge impeller to a temporary storage receptacle either carried on or pulled by the harvester. The bolls, in passing through the impeller, contact the vanes or blades thereof and consequently are subject to impact and/or tearing forces which may damage the bolls and deteriorate the quality thereon. The instant application is similar in subject matter to my earlier filed application, Serial No. 240,565, filed August 6, 1951, and assigned to the assignee of the present invention, but now abandoned.

The present invention now provides an improved impeller-type conveying system wherein efficient suction pickup and pressure discharge occurs without mechanical contact between the impeller and the material being conveyed. Further, as applied to a cotton harvester, the system of the present invention may be utilized to convey cotton from a plurality of pickup conduits to a single discharge conduit, with the pickup and discharge conduits being merged at the impeller. At the point of transition of the cotton from the suction pickup to pressure discharge, the cotton is subjected to centrifugal force which is effective to impel the cotton into the pressure discharge conduit without the mechanical impact formerly necessary to effect a radical change in the cotton path of travel.

Thus, the impeller is mounted in an involute-type housing, so that the distance of the impeller blade tips from the housing inner surfaces varies about the circumference of the impeller. In addition, the pickup conduit is substantially concentric with the involute impeller housing and blends with the involute housing through a scroll section which imparts side thrust to the cotton to force the same into the involute housing at a point where the distance from the impeller blade tips to the involute housing is approximately at a maximum. Since centrifugal force retains the cotton against the involute housing periphery and the blade tip-housing distance is at a maximum at the point of cotton entry, no cotton-impeller blade contact can occur.

The suction pickup is effected by venting the intake port of the impeller to the pickup conduit through a substantially vertical passage communicating with the intake conduit at a curved portion of the conduit, so that the suction exerted at the impeller intake port is effective to remove the air from the harvested crop, but not effective to pick up the crop itself, since the crop is held against movement into the intake port by the centrifugal forces generated therein due to a radical change in the direction of crop movement. Substantially all of the air in the suction intake port passes through the impeller by entry into the suction intake port, and this air is again utilized by the fan blast effective to convey the crop from the outlet side of the impeller. The utilization of a single outlet port from the impeller housing having a cross sectional area considerably less than the area of the two intake conduits insures the presence of sufficient air for blasting the crop from the impeller housing.

It is, therefore, an important object of the present invention to provide an impeller-type air conveying system wherein efficient suction pickup and pressure discharge occurs without mechanical contact between the impeller and the material being conveyed.

Another important object is the provision of means for conveying material by air from a plurality of suction pickup conduits to a single discharge conduit by the utilization of a single impeller located at the juncture of the pickup and discharge conduits and without mechanical contact between the impeller and material being conveyed.

It is a further object of this invention to provide a combined suction pickup and pressure discharge pneumatic system including a centrifugal-type fan impeller mounted within an involute housing, the material being conveyed undergoing transition from suction pickup to pressure discharge by passage through the housing without mechanical contact with the impeller within.

Still another important object of the present invention is the provision of a conveying system having an impeller mounted in an involute housing, material to be conveyed by the impeller passing from a pickup housing to a discharge conduit by passage through the involute housing and centrifugal forces generated upon passage of the material through the pickup housing and the involute housing being utilized to prevent impeller contact with the conveyed material.

Yet another object is the provision of a pneumatic conveying system including a pair of adjacent involute housings, one of which has an impeller mounted thereon and a discharge conduit communicating therewith, and the other of which communicates with a suction pickup conduit and with the first housing, the centrifugal forces exerted upon material passing through the housing being sufficient to prevent material-impeller contact.

It is an additional object of the present invention to provide a pneumatic conveying system of the combined suction pickup and pressure discharge type wherein an impeller utilizes substantially all of the air from the suction pickup to generate a discharge pressure air stream and the impeller intake port receives air from the suction intake conduit from a point where the crop is prevented from entering the intake port by the centrifugal forces generated upon a radical change in the direction of movement of the crop in a suction air stream.

The specific nature of this invention, as well as other objects and advantages thereof, will become apparent to those skilled in the art from the following detailed description, taken in conjunction with the attached sheets of drawings on which, by way of preferred example only, is illustrated on embodiments of this invention.

On the drawings:

Figure 1 is a fragmentary side elevational view of a harvesting machine, shown in dotted outline, mounted upon a tractor, also shown in dotted outline, and provided with a pneumatic conveying system of the present invention;

Figure 2 is a fragmentary plan view of the harvester, tractor, and conveying system of Figure 1;

Figure 5 is an enlarged view of a portion of the conveying system taken along the plane 5—5 of Figure 2;

Figure 6 is an enlarged fragmentary sectional view taken along the plane 6—6 of Figure 5;

Figure 7 is an enlarged sectional view taken along the plane 7—7 of Figure 1; and Figure 8 is an enlarged sectional view taken along the plane 8—8 of Figure 1.

As shown on the drawings:

Figure 3:
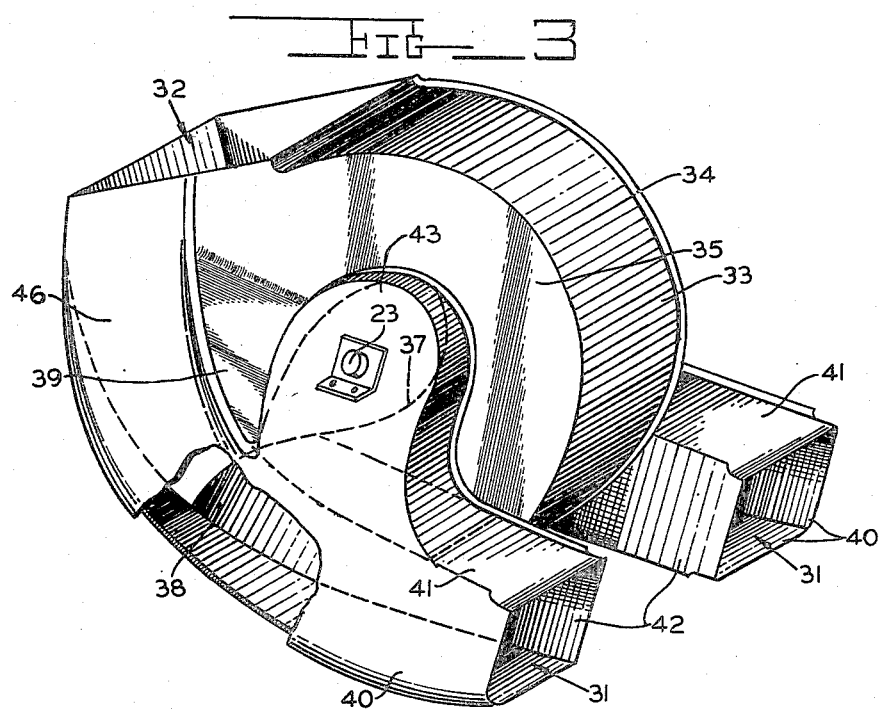
Figure 3 is an enlarged perspective view of a portion of the conveying system.

In Figures 1 and 2, reference numeral 10 refers generally to a tractor or other prime mover provided with a power-take-off 11 coupled, as through a universal joint 12, to a driven shaft 13 for driving a sheave 14. The power-take-off assembly is utilized to supply driving power for a harvester, such as a cotton stripper or the like 15, carried by a tractor mounted frame, indicated generally at 16, and including a tubular frame member having a rear lateral portion 17 mounted on the tractor at the rear end thereof. The tubular member 17 supports a second sheave 18 aligned with the sheave 14 and driven thereby through a V-belt 19. The frame member 16 also carries a shaft bracket 20 journaling a shaft 21 driven by the sheave 18 and driving a pair of beveled gears 22. The bevel gears 22 drive an impeller shaft 23 to provide the motivating power for a pneumatic system of the present invention, as will be hereinafter more fully described.

The frame 16 is completed by a forwardly extending portion 24 and a laterally outwardly extending terminal portion 25 carrying the harvesting apparatus thereon. The lateral extension 25 of the frame carries a pair of rearwardly extending arms 26 supporting the shaft 23 upon the frame and journaling the same for rotation.

It will be appreciated that the conveying system of the present invention may be utilized with the various forms of harvesting machinery and particularly with cotton harvesting machinery of either the picker or stripper type. If the conveying system is utilized with a cotton harvesting machine, the stripper of picker elements is located forwardly of the conveying system and the conveying system is utilized for providing a suction pickup directly adjacent the harvester elements, i. e., the picker spindles or stripper rolls, and also to provide a pressure discharge system for conveying the harvested cotton to a suitable receptacle.

Figure 4:
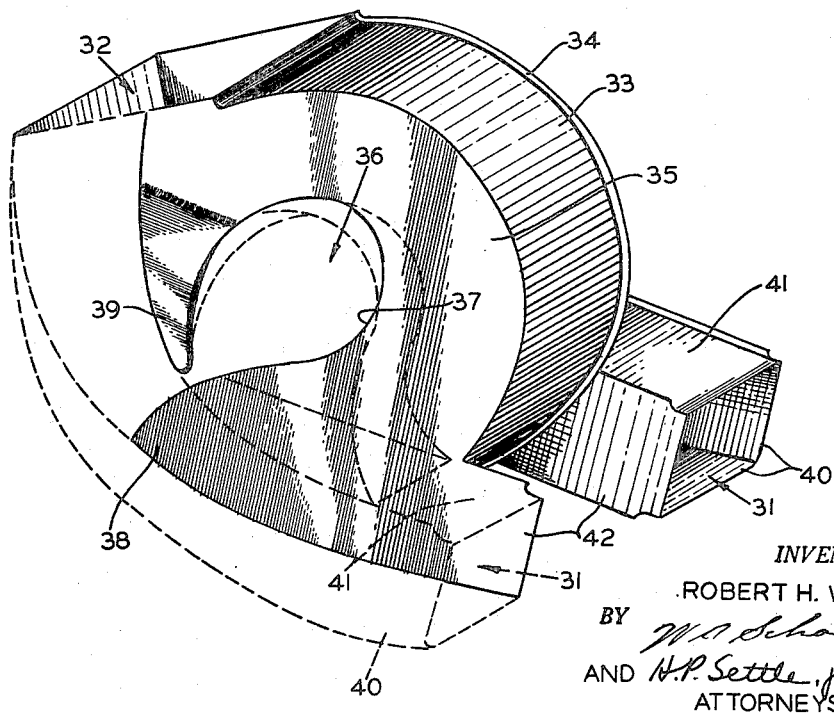
Figure 4 is an enlarged perspective view with parts removed and indicated in dotted outline to further illustrate the conveying system.

The conveying system of the present invention, as particularly illustrated in Figures 3–8, includes a central involute fan housing portion 30 and a pair of crop intake conduits 31 blending with the fan housing 30 to define a central discharge port 32 located rearwardly of the fan housing at the point of maximum housing diameter. More particularly, the fan housing 30 is defined by a central wrapper sheet 33 which is essentially rectangular in configuration and which laps the entire fan housing to define the outer periphery thereof, the two free wrapper ends being spaced to define the fan discharge opening 32. The wrapper sheet 33 is provided with lateral side flanges 34 which abut side panel sheets 35. The two side panel sheets 35 are mirror images of one another, as best illustrated in Figure 4, and are generally circular in outline to define the sides of an interior involute impeller chamber 36. The side sheets 35 are each provided with a central, generally elliptical, lateral intake opening 37 and the lower end of each of the side sheets 35 is cut away to define an integral deflector vane 38 and an integral forward extension 42 for a purpose to be hereinafter more fully described.

The rear portions of the side sheets 35 terminate in an integral downturned and laterally outwardly deflected extension 39, also for a purpose to be hereinafter more fully described. The crop intake conduits 31 for the fan housing 30 are best illustrated in Figures 3, 7, and 8. These conduits have their laterally outward sides and their bottom side defined by a single piece 40 of sheet metal joined to a wrapper sheet 41 (Figure 3) to define the upper closure wall thereof and the inner wall 42 of the intake conduits is integrally formed, as hereinbefore described, with the housing side sheets 35. The forward portions of the intake conduits 31 extend generally tangentially to the housing toward the harvester 15 in communication therewith to receive a crop therefrom. The rear portions of intake conduits 31 generally underlie the intake opening 37 and are sharply curved therebeneath so as to be concentric with the impeller housing. The conduits 31 taper laterally rearwardly to blend smoothly with the side sheets 35 at those portions of the side sheets which define the housing outlet port 32. It will be noted from Figures 6–8 that the tapered conduit portions are in full communication with the discharge opening and with the interior of the impeller housing rearwardly of the baffle 38.

Integrally formed with each of the sheets 40 which define the intake conduits is an upstanding wall portion 43 which is laterally spaced from the associated side sheet 35 so as to laterally overlie the side sheet opening 37. The upstanding portion 43 is joined to the intake conduit wrapper 41 so that the portion 43 and the wrapper 41 cooperate to define an upstanding passage 44 in full communication with the opening 37 in the side sheet 35.

It will be noted from Figures 3, 4, and 5 that the intake passage 44 which is thus defined has a relatively wide opening at its base in full communication with the crop conduit 31 and that this conduit is inclined upwardly and rearwardly at that portion of the conduit which blends with the intake passage 44. The conduit 31 tapers inwardly rather sharply rearwardly of the intake passage 44, as at 46, so that a smooth conduit passage is provided rearwardly of the intake passage 44 and in full communication with the outlet port 42. The side sheet extension 39 is deflected downwardly and outwardly, as heretofore explained, to blend smoothly with the intake conduit 41 rearwardly of the inlet passage 44. Thus, the single sheet 40, which defines the outer wall and the lower wall of the conduit 41 in its forward end, now defines the entire convex intake conduit rearwardly of the passage 44.

Also, it will be noted that the upstanding portion 43 of the wall 40, which cooperates with the wrapper 41 to define the intake port 44, is substantially vertical throughout its entire extent so that the smooh passage of air from the suction conduit into the impeller chamber 36 through the entire extent of the opening 37 is insured.

Those portions of the wall 40 which define the upstanding portions 43 are apertured to journal the impeller shaft 23 and a plurality of impeller blades 45 are rigidly mounted upon the shaft to define an impeller positioned within the involute housing provided by the wrapper 33 and the side plates 35.

The operation of the conveyor system of the present invention will be readily appreciated. The crop harvested by the harvesting unit 15 is withdrawn from the harvesting unit through the intake conduits 41 which are vented to the intake sides of the impeller through the intake passage 44 and the opening 37. The mixture of the crop and educted air within the conduits 31 is drawn along the length thereof by the suction effect exerted in the conduits by the impeller. As the crop and air stream enters the intake area of the conveying system, the direction of flow of the crop and the air is radically changed by forcing the crop to follow the arcuate path of the intake conduit around the periphery of the housing. This change in direction of movement will cause the crop to move along the outer surface of the conduit, which is concentric with but radially spaced from the impeller, due to the effects of centrifugal force thereon and at this time the air is drawn away from the crop into the intake opening 37 through the passage 44. The air thus enters the impeller chamber from which the air is forced by rotation of the impeller, with the air leaving the impeller chamber through the discharge opening 32, since the wrapper 33 stops at the opening 32 and the impeller chamber 36 and the discharge opening are in full communication.

The baffle 38 formed by the lower extension of the side sheets 35 prevents the lateral movement of the crop and the possible entry of the crop into the impeller housing with the air drawn into the intake opening 37. This baffle 38 lies in the plane of the inner surface of the intake conduits so that the crop cannot move laterally inwardly. The baffle stops considerably short of the outlet opening 32 so that the area of the intake opening is not materially reduced by the baffle. The conduits 31 are inwardly convergent rearwardly of the baffle so that the entry of the crop into the outlet opening is accomplished by forcing the crop laterally inwardly through the conduit portions 41, and the inertia of the crop is sufficient to carry the crop into the impeller housing after the air has been removed therefrom through the intake opening 37. The output air from the impeller 45 is vented to the crop during passage of the crop through those portions of the conduits which lie beyond the baffle 38, and the discharge pressures are effective to remove the crop from the housing through the opening 32.

From the foregoing structural description of the conveying system, it will be seen that means are provided for utilizing the suction effect of a centrifugal impeller to elevate material, such as harvested cotton bolls, to the impeller housing and then utilizing the positive pressure discharge of the impeller to elevate the bolls to a suitable receptacle. However, there is no physical contact between the conveyed articles and the impeller blades, and the total conveying effect, both to and from the impeller, is obtained by impeller draft output and not by any harmful mechanical contact.

An involute impeller housing and an eccentrically disposed rotary impeller are employed to insure adequate pumping of air and involute intake conduits are employed to subject the conveyed material to centrifugal forces in such a manner as to avoid impeller-material contact. Conveyed material, upon first entering the conduits, is forced to make a radical change in direction, so that the material is flung outwardly against the inner periphery of the conduits by centrifugal force, and the conveyed material continues to follow the contour of the inner periphery of the intake conduits and then the impeller housing until the same is discharged through the discharge port of the impeller housing. During centrifugal travel of the conveyed articles through the conduits, the articles are laterally deflected by the rear portions of the intake conduits so that the conveyed material is introduced into the impeller housing along the inner surface of the impeller housing peripheral wall. In this manner the conveyed material is constantly subject to the centrifugal force, and such force is effective to prevent impact of the impeller blades with the conveyed material.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A crop conveying system comprising an impeller housing having a central lateral intake opening and a discharge opening each communicating with an interior impeller chamber, a rotary impeller in said chamber, means defining a crop conduit immediately laterally adjacent said housing, said conduit underlying said intake opening and having a relatively sharply curved section generally concentric with said impeller housing but laterally diminishing in cross-sectional area to blend smoothly with said housing in full communication with said discharge opening, said conduit having an upper opening in said curved section generally vertically aligned with said intake opening, and means defining a vertical passage establishing direct vertical fluid communication between said conduit opening and said intake opening, said last named means including a generally vertically extending baffle preventing direct lateral communication between said conduit and said intake opening whereby said impeller is effective upon rotation thereof to generate a suction in said conduit to draw fluid from said conduit through said conduit opening and said vertical passage into said impeller chamber without removing the crop from said conduit due to the opposition of centrifugal forces on said crop tending to retain said crop in said curved conduit section.

2. In a harvesting machine, a crop conveying system for conveying a crop from a harvesting unit to a receptacle comprising a pair of laterally spaced side sheets and a wrapper interposed therebetween to define a central involute chamber, said side sheets each having a central intake opening spaced radially from said wrapper in the area of maximum chamber diameter to define lateral discharge openings and the wrapper ends being spaced to define a discharge port communicating with said chamber also in the area of maximum diameter, said side sheets each having a forward extension spaced circumferentially from said discharge port, a conduit sheet secured to each of said side sheets, respectively, having a rear convex portion substantially concentric with said housing and overlying said discharge openings to be in communication with said housing at said area of maximum diameter, an inlet wrapper secured to and extending laterally of each of said side sheet forward extensions, respectively, for cooperation with forward portions of said conduit sheets to define forward conduits connectable to said harvesting unit to receive a crop therein, said conduit sheets each having an upwardly extending projection laterally overlying said intake openings, respectively, and said inlet wrapper joining said conduit sheet projections to said side sheets to form an enclosed generally vertically extending inlet passage for air flow from said conduits to said impeller chamber, and a rotary impeller in said chamber, whereby said crop travels through said conduits into said housing through said lateral discharge openings under the influence of the air stream generated upon rotation of said impeller and air is exhausted from said conduits to said impeller housing through said intake openings.

3. A crop conveying system comprising an impeller housing having a central lateral intake opening and a discharge opening each communicating with an interior impeller chamber, a rotary impeller in said chamber, means defining a crop conduit immediately adjacent said housing, said conduit underlying said intake opening and having a relatively sharply curved section generally concentric with said impeller housing laterally diminishing in cross-sectional area to blend smoothly with said housing in full communication with said discharge opening, said conduit having an upper opening in said curved section generally vertically aligned with said intake opening, means defining a vertical passage establishing fluid communication between said conduit opening and said intake opening, and a vertical extending baffle interposed between said conduit and said impeller chamber to prevent lateral passage of the crop into said chamber at said conduit upper opening and forwardly thereof, said baffle lying alongside said impeller in axially spaced relation thereto to prevent direct lateral communication between said conduit and said impeller but terminating rearwardly of said upper opening to prevent interference with passage of said crop into said impeller housing in the vicinity of said discharge opening, whereby said impeller is effective upon rotation thereof to generate a suction in said conduit to draw fluid from said conduit through said conduit opening and said vertical passage into said impeller chamber without removing the crop from said conduit due to the opposition of centrifugal forces on said crop tending to retain said crop in said curved conduit section.

4. In a harvesting machine, a crop conveying system comprising an involute impeller housing having a central lateral intake opening and an upper central discharge opening each communicating with a centrally located interior impeller chamber, a rotary impeller located in said chamber, a crop conduit having a curved rear portion generally concentric with said involute housing from a portion directly underlying said intake opening to said discharge opening and a substantially straight, forward portion projecting forwardly generally tangentially of said housing, the arcuate extent of the concentric portion of said conduit being less than 180°, said curved rear portion of said conduit underlying said intake opening having a port therein generally vertically aligned with said intake opening, said rear portion of said conduit tapering laterally inwardly rearwardly of said port to blend smoothly with said impeller housing in full communication with said discharge opening, a baffle interposed between said conduit and said impeller housing to prevent the lateral passage of a crop from said conduit into said housing in the vicinity of said port, and means defining a generally vertical intake passage in full communication with said intake opening of said housing and said conduit port above said baffle.

5. In a harvesting machnie, a crop conveying system for conveying a crop from a harvesting unit to a receptacle comprising a pair of laterally spaced side sheets and a wrapper interposed therebetween to define a central involute chamber, said side sheets each having a central intake opening and being spaced radially from said wrapper in the area of maximum chamber diameter to define lateral discharge openings and the wrapper ends being spaced to define a discharge port communicating with said chamber also in the area of maximum diameter, said side sheets each having a forward extension spaced circumferentially from said discharge port, a conduit sheet secured to each of said side sheets, respectively, having a rear convex portion substantially concentric with said housing and overlying said discharge openings to be in communication with said housing at said area of maximum diameter, an inlet wrapper secured to and extending laterally of each of said side sheet forward extensions, respectively, for cooperation with forward portions of said conduit sheets to define forward conduits connectable to said harvesting unit to receive a crop therein, said conduit sheets each having an upwardly extending projection laterally overlying said intake openings, respectively, and said inlet wrapper joining said conduit sheet projections to said side sheets to form an enclosed generally vertically extending inlet passage for air flow from said conduits to said impeller chamber, said side sheets each having a depending baffle surface generally underlying said central intake opening to separate said conduit from said involute chamber in the area of said inlet passage, said baffle surface terminating rearwardly of said inlet passage to accommodate communication between said lateral discharge openings and said rear convex conduit portions only, and a rotary impeller in said chamber, whereby said crop travels through said conduits into said housing through said lateral discharge openings under the influence of the air stream generated upon rotation of said impeller and air is exhausted from said conduits to said impeller housing through said intake openings.

6. In a harvesting machine, an air conveying system for harvested material comprising an impeller casing having a tangential discharge snout and a central intake port, a concentric bladed impeller rotatably mounted in said casing, with the spacing of the blade tips from the casing varying circumferentially to increase in the direction of blade rotation toward said snout, said casing having a concentrically curved discharge opening located in the region of maximum blade tip spacing from said casing and forwardly of said snout relative to the direction of impeller rotation, conduit means having a laterally diminishing rear portion concentric with said casing and overlying said discharge opening exteriorly of said impeller casing, the forward portion of said conduit means blending smoothly with said rear portion and communicating with said intake port opening for the venting of air thereto ahead of said discharge opening, and a generally vertically extending baffle interposed between said conduit means and said intake port opening, a portion of said baffle lying within the radial rotational path of said impeller to deflect material from said impeller, the material being prevented from entering said intake port by centrifugal force and being deflected by said conduit rear portion through said discharge opening along a path substantially tangential to said blade tips.

References Cited in the file of this patent

UNITED STATES PATENTS

| | | |
|---|---|---|
| 760,413 | Bennie | May 24, 1904 |
| 1,401,583 | Christoph | Dec. 27, 1921 |